United States Patent
Cox et al.

[11] 3,932,570
[45] Jan. 13, 1976

[54] METHOD OF SEALING FIBERS IN APERTURES

[75] Inventors: David Lloyd Cox; Neil Patrick Hugh McDonnell, both of Stockton-on-Tees, England

[73] Assignee: Imperial Chemical Industries Limited, London, England

[22] Filed: Mar. 21, 1972

[21] Appl. No.: 236,635

[30] Foreign Application Priority Data
Mar. 26, 1971 United Kingdom.............. 7911/71

[52] U.S. Cl. ............... 264/69; 264/88; 264/243; 264/261; 264/263; 264/267; 264/271; 264/273; 264/311
[51] Int. Cl.² ................. B29D 3/00; B29D 31/00
[58] Field of Search ........... 264/310, 311, 258, 172, 264/69–71, 243, 263, 261, 271, 1, 108, 267; 425/263, 805, 456; 156/73, 296, 180, 99, 166

[56] References Cited
UNITED STATES PATENTS

| | | | |
|---|---|---|---|
| 2,078,358 | 4/1937 | Wright et al. | 264/243 X |
| 2,298,156 | 10/1942 | Person | 264/243 |
| 2,643,158 | 6/1953 | Baldanza | 264/243 |
| 2,655,409 | 10/1953 | Baldanza | 264/243 X |
| 2,992,956 | 7/1961 | Bazinet | 264/1 |
| 3,118,752 | 1/1964 | Breadner | 264/311 X |
| 3,442,002 | 5/1969 | Geary et al. | 264/258 X |
| 3,512,223 | 5/1970 | Willinger | 264/263 X |
| 3,567,185 | 3/1971 | Ross et al. | 259/1 |
| 3,731,907 | 5/1973 | Lash | 259/1 R |

FOREIGN PATENTS OR APPLICATIONS
1,207,814 10/1970 United Kingdom............... 156/296

OTHER PUBLICATIONS
Shanley, Strength of Materials, McGraw–Hill, N.Y. (1957) pp. 565–575.

Primary Examiner—Robert F. White
Assistant Examiner—Willard E. Hoag
Attorney, Agent, or Firm—Cushman, Darby & Cushman

[57] ABSTRACT

Bundles of fibres are sealed into gaps by surrounding them at the gap with a pool of a sealing material, and longitudinally vibrating the bundle to work the sealing material between the fibres. The fibres may be hollow fibres used for reverse osmosis.

10 Claims, 1 Drawing Figure

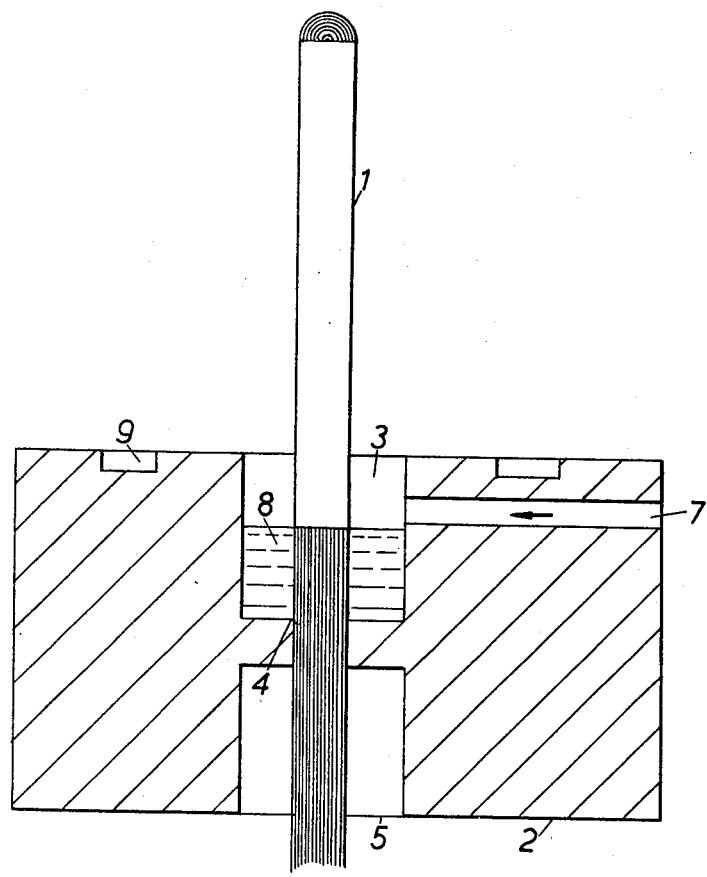

METHOD OF SEALING FIBERS IN APERTURES

This invention relates to sealing bundles of fibres into gaps.

The invention comprises a process for sealing a bundle of substantially parallel fibres into a gap in a holding member or between a plurality of holding members, which comprises applying a liquid sealing material as a pool through which the fibres pass and which contacts the said member of members and vibrating the bundle longitudinally to flex it at the position in which it passes through the pool to work sealing material between the fibres. The fibres pass through the pool in the sense that they do not end in the pool.

Preferably the sealing material is one which sets to form a solid with time, for example, an epoxy resin.

The fibres may be solid or hollow fibres; for example they may be hollow fibres of which the walls constitute semi-permeable membranes, which fibres are useful in osmotic pressure determinations or separations by reverse osmosis.

The gap is suitably a substantially circular hole. It may, however, be, for example a square, slit, or a gap of irregular shape.

The gap may lead from a recess in the member or members, which recess confines the pool of sealing material surrounding the fibres and contacting the member or members to its desired position. Alternatively the pool may be confined to the desired position by surrounding the fibres with a ring, for example, a plastic or metal ring between which and the fibres the sealing material is introduced. In this case the ring can be allowed to set in position if the sealing material is such as to set to form a solid.

The pool is preferably formed on the upper surface of the member or members as this permits the invention to be carried out in the simplest manner, the sealing material being held in position by gravity. However, it may be desired, if for example, the sealing material is of high viscosity or if a more thorough penetration of sealing material between the fibres in the gap is required, to hold the sealing material in position by centrifuging.

In order to force sealing material between fibres in the gap more effectively a differential pressure across the gap may be employed; for example the opening of the gap remote from the pool of sealing material may be subjected to a vacuum or the pool may be subjected to elevated pressure whilst the other side of the gap is at atmospheric pressure. A differential pressure may be applied during or after flexing the bundle of fibres.

If the assembly of a bundle of hollow fibres, of which the walls constitute semi-permeable membrances, and holding member or members is to be used for separations of the osmotic type (that is of the membrane permeation type) the fibres will be subjected to a greater pressure on one side of the gap than on the other, the fibres on one side being open. The open ends are preferably on the lower pressure side. It is preferred that the pool of sealing material be formed on the side which is subject to the greater pressure so that it will form an abutment against the member or members and thereby prevent the fibres from being forced through the gap. The fibres may be formed as loops of which both ends pass through the gap or may be sealed into a suitable vessel; the liquid to be treated in this case may pass through the fibres through both seals.

The frequency of vibrations is normally in the range 0.1 to 200 Hertz and preferably 3 to 30 Hertz.

The vibrations are preferably applied for at least 20 seconds and the number of vibrations is preferably at least 50.

The peak-to-peak amplitude of vibration divided by the length of the fibre bundle which is free to bulge between the point at which the vibration is applied and the gap is preferably in the range 1½ to 0.1.

The viscosity of sealing materials is normally in the range 20 to 100,000 centistokes, for example 50 to 2,000 centistokes.

One form of the invention will now be described with reference to the accompanying drawing, which shows a bundle 1, 16 mm. in diameter, of hollow fibres each of which is 50 microns in diameter having an internal diameter of 20 microns and made of nylon and constituting part of a loop which is to be sealed into a tube plate 2 shown in cross-section, of 100 mm. external diameter formed with a central recess 3 35 mm. in diameter leading to a central aperture 4. A central recess 5 of 35 mm. diameter is also provided on its opposite side. Central aperture 4 is 16 mm. in diameter.

The tube plate 2 is provided with an 'O' ring groove 9 and 4 holes for bolts which lie parallel to the axis of the tube plate (these are not shown). Liquid inlet port 7 passes through the tube plate 2 at a distance of 25 mm. above the aperture 4.

The bundle of fibres 1 is bound to within 18 mm. of the aperture 4 and an epoxy resin sealing compound is introduced to form a pool 8 18 mm. deep surrounding the bundle of fibres 1. The bundle of fibres 1 is longitudinally vibrated at a rate of 10 cycles per second and a peak-to-peak amplitude of 12 mm. for a period of 1 hour. Curing is complete after 24 hours.

The tube plate may now be secured to a pressure vessel and organic liquids may be separated by reverse osmosis through the fibres.

We claim:

1. A process of sealing a bundle of substantially parallel fibres into a gap defined by at least one holding member, said gap having a cross-sectional size and shape substantially the same as the cross-sectional size and shape of said bundle, said process comprising:
    introducing the bundle of fibres into said gap, contacting a pool of curable liquid sealing material with the fibres at their position of entry into said gap, said pool lying outside said gap, said pool being confined adjacent said gap and working sealing material between the fibres in the gap by vibrating the bundle longitudinally and causing said fibers to flex in the pool intermediate a point at which vibration is applied and said gap and curing said sealing material.

2. A process as claimed in claim 1 in which a sealing material which sets to form a solid with time is used.

3. A process as claimed in claim 1 in which sealing material is forced between fibres in the gap by applying a differential pressure across the gap.

4. A process as claimed in claim 1 in which the sealing material is held in position by centrifuging.

5. A process as claimed in claim 1 in which the frequency of vibrations is in the range 0.1 to 200 Hertz.

6. A process as claimed in claim 5 in which the peak-to-peak amplitude of vibration divided by the length of the fibre bundle which is free to bulge between the point at which the vibration is applied and the gap is in the range 1.5 : 0.1.

7. A process as claimed in claim 1 in which the fibres are hollow fibres of which the walls constitute semipermeable membranes.

8. A process as claimed in claim 7 in which the gap leads from a recess in the member which recess confines the pool of sealing material to its desired position.

9. A process as claimed in claim 7 in which the pool is confined to the desired position by surrounding the fibres with a ring between which and the fibres the sealing material is introduced.

10. A process of sealing a bundle of substantially parallel fibres into a gap defined by at least one holding member, said gap having a cross-sectional size and shape substantially the same as the cross-sectional size and shape of said bundle, said process comprising introducing the bundle of fibres into the gap; providing a pool of liquid settable sealing material outside the gap at the location where the fibres enter the gap so that the fibres extend completely through the pool from a location beyond the surface of the pool and into the gap said pool being confined adjacent said gap; working the liquid sealing material between the fibres in the gap by vibrating the bundle longitudinally at a frequency in the range 0.1 to 200 Hertz to flex the bundle in the pool intermediate a point at which vibration is applied and said gap; and setting the sealing material which has been worked between the fibres in the gap.

* * * * *